(12) United States Patent
Torres

(10) Patent No.: US 12,340,680 B2
(45) Date of Patent: Jun. 24, 2025

(54) DISPLAYING IP ADDRESS OF NETWORK DEVICES USING PORT LED INDICATORS

(71) Applicant: Hewlett Packard Enterprise Development LP, Spring, TX (US)

(72) Inventor: Marco A. Torres, San José (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 5 days.

(21) Appl. No.: 18/494,091

(22) Filed: Oct. 25, 2023

(65) Prior Publication Data
US 2025/0140086 A1 May 1, 2025

(51) Int. Cl.
*G08B 5/36* (2006.01)
*H04L 43/0817* (2022.01)

(52) U.S. Cl.
CPC ............ *G08B 5/36* (2013.01); *H04L 43/0817* (2013.01)

(58) Field of Classification Search
CPC .............................. G08B 5/36; H04L 43/0817
See application file for complete search history.

(56) References Cited

U.S. PATENT DOCUMENTS

| | | | |
|---|---|---|---|
| 7,312,719 B2 | 12/2007 | Hsieh | |
| 8,094,576 B2 | 1/2012 | Matityahu et al. | |
| 8,208,386 B2 * | 6/2012 | Fowler | H04L 43/0811 714/25 |
| 8,848,722 B2 * | 9/2014 | Chapel | H01R 25/006 370/220 |
| 9,100,325 B2 * | 8/2015 | Pannell | H04L 41/22 |
| 10,197,224 B1 * | 2/2019 | Macias | H05B 45/37 |
| 2002/0113714 A1 * | 8/2002 | Lopez | G06F 11/325 340/815.45 |
| 2021/0091852 A1 * | 3/2021 | Parangattil | G06V 20/20 |

OTHER PUBLICATIONS stackoverflow.com, "How To Tell an IP Address with 4 LEDs?" Aug. 2010, 9 pages.

* cited by examiner

*Primary Examiner* — John A Tweel, Jr.
(74) *Attorney, Agent, or Firm* — Yao Legal Services, Inc.

(57) ABSTRACT

A method, network device, and non-transitory computer-readable storage medium are provided for facilitating displaying an Internet Protocol (IP) address of a network device. During operation, the system detects an activation of an IP light-emitting diode (LED) mode on the network device, wherein the network device includes a set of numbered ports each with a corresponding LED indicator. Responsive to detecting the activation, the system initiates a sequence which indicates an IP address of the network device by: for each digit of the IP address, turning on and off the LED indicator for one of the numbered ports, the number of which corresponds to the value of the digit; and for each dot of the IP address, turning off all the LED indicators. Responsive to determining that the sequence is complete, the system returns to a default LED mode on the network device.

20 Claims, 9 Drawing Sheets

DISPLAYING IP ADDRESS OF NETWORK DEVICES USING PORT LED INDICATORS

BACKGROUND

Field

Some lower-cost network devices do not include a serial interface via which an administrator can obtain the Internet Protocol (IP) address of the network device. The lack of the serial interface may be inconvenient to users, e.g., upon first connecting to the network device. Adding a serial interface to these devices can increase the cost, and fetching the IP address information from a Dynamic Host Configuration Protocol (DHCP) server or using a network sniffer may be burdensome.

BRIEF DESCRIPTION OF THE FIGURES

In the figures, like reference numerals refer to the same figure elements.

DETAILED DESCRIPTION

Figure 1:
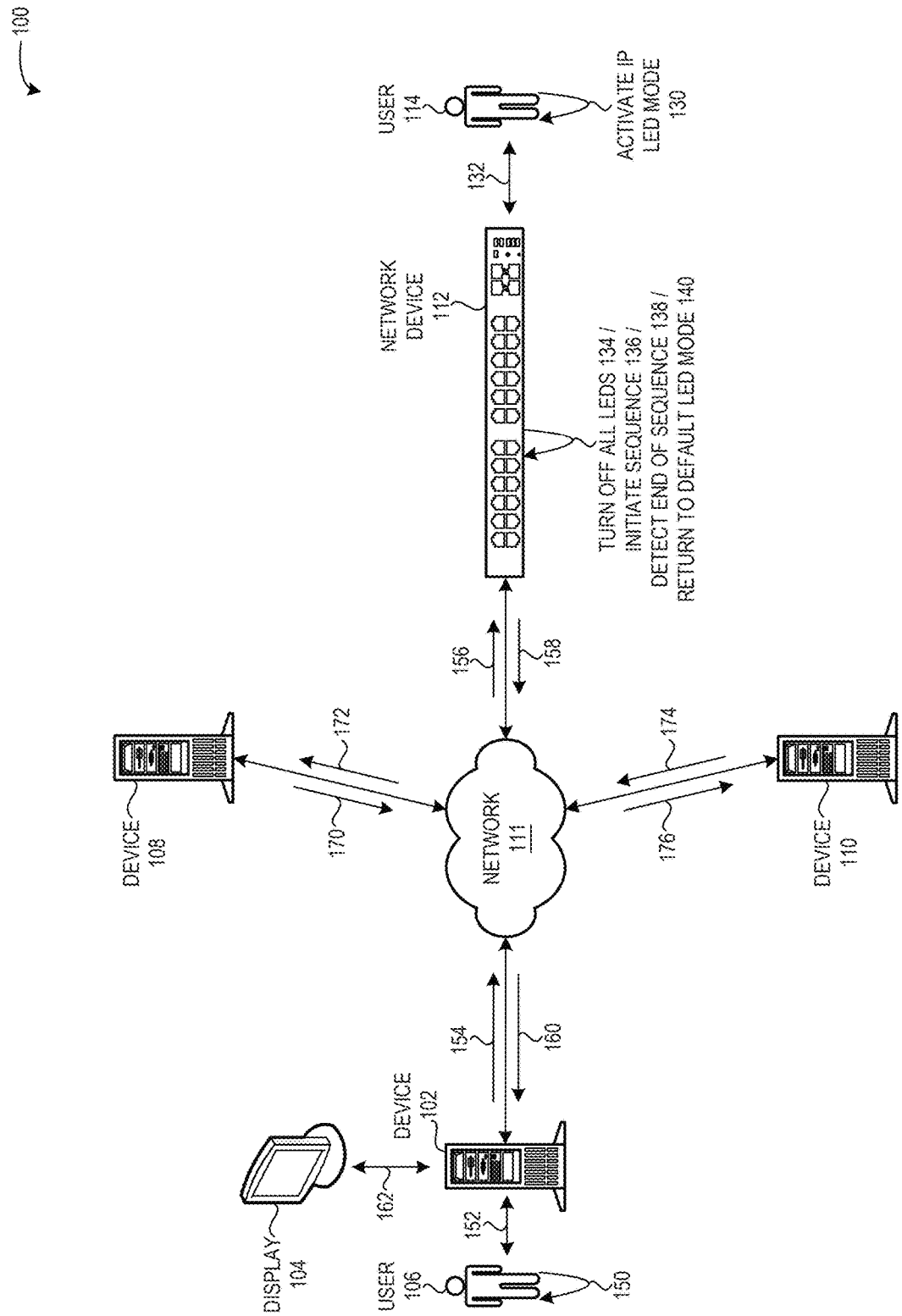
FIG. 1 illustrates an environment for facilitating displaying the IP address of a network device using the light-emitting diode (LED) indicators corresponding to ports on the network device, in accordance with an aspect of the present application.

Aspects of the instant application provide a system and method which uses existing LED indicators on the ports of a network device to indicate the IP address assigned to the network device. In a new LED mode, the LED indicator on a numbered ports can turn on and off to indicate the corresponding digit of the IP address of the network device (e.g., ports 1-9 can indicate digits 1-9 and port 10 can indicate digit 0).

As described above, some network devices may not include a serial interface via which an administrator can obtain information about the device, such as the IP address of the network device. Examples of such network devices may include switches used in the Small and Midsize Business (SMB) segment of the industry. The lack of the serial interface may be inconvenient to users, e.g., upon first connecting to the network device. A user or administrator may face difficulties in determining the IP address assigned to the device by the DHCP server. Adding a serial interface to these devices can increase the cost, and fetching the IP address information from DHCP server or using a network sniffer may be burdensome. The IP address may be assigned to the network device, e.g.: dynamically using a network management protocol such as DHCP; or as a static IP address based on a configuration made to the network device.

The described aspects provide a new LED mode which can activate the LED indicators on certain ports of a network device to indicate the IP address of the network device. Some network devices may include, e.g., 24 or 48 ports, where each port can be equipped with an LED that can be individually illuminated. The network device can detect an activation of the new LED mode (an "IP LED mode") based on, e.g.: a user pressing an LED mode button on the network device or based on a command received via software running on the network device. An example of communications which activate the IP LED mode are described below in relation to FIG. 1, and an example of a network device with an LED mode button and an indicator for the IP LED mode is described below in relation to FIG. 2.

Upon detecting the activation of the IP LED mode, the network device can initiate a sequence which indicates the IP address of the network device. The network device can first turn off (if the LED indicators are on) the LED indicators for at least the first ten ports or any group of ten ports. For example, in network devices with 48 ports, the network device can turn off the LED indicators for ports 1-10 or ports 11-20 or for all 48 ports. In the described aspects, ports 1-9 can indicate digits 1-9 and port 10 can indicate digit 0. Other groups of numbered ports may also be used to indicate digits 1-9 and digit 0. The aspects which describe "at least the first ten ports" are provided for illustrative purposes and are not limited to at least ports 1-10 only. For each digit of the IP address, the network device can turn on (e.g., for a first predetermined period of time) and off the LED indicator for one of the numbered ports, where the number of the port corresponds to the value of the digit. For each dot of the IP address, the network device can turn off (e.g., for a second predetermined period of time) the LED indicators for at least the first ten ports. As an example, an IPV4 address may indicate a 32-bit value expressed in decimal notation, with its bits separated by a "dot." The format of an IP address can be: x.x.x.x where x is an octet and is a decimal value between 0 and 255 (e.g., 192.168.0.1). An IPv4 address can contain three periods (or "dots") and four octets. An exemplary sequence which indicates the IP address of a network device is described below in relation to FIGS. 3A-D.

Network Environment

FIG. 1 illustrates an environment 100 for facilitating displaying the IP address of a network device using the LED indicators corresponding to ports on the network device, in accordance with an aspect of the present application. Environment 100 can include: a device 102 with an associated display 104 and an associated user 106; devices 108 and 110; and a network device 112 with an associated user 114. Devices 102, 108, and 110 can each represent a computing system, such as a server or a networked device with a processing resource (e.g., a switch or a router). Network device 112 can represent, e.g., a switch, router, server, or computing system which may or may not include a serial interface. Devices 102, 108, 110, and 112 can communicate via a network 111.

During operation, user 114 may determine to obtain the IP address of network device 112, which may not include a serial interface. User 114 may be an administrator of network device 112. User 114 can activate an IP LED mode (e.g., by pressing an LED mode button on network device 112, as described below in relation to FIG. 2) (operation 130). Responsive to detecting the activation (via a communication 132), network device 112 can turn off all the LED indicators of all its ports (or at least the LED indicators of ports 1-10) (operation 134) and initiate a sequence which indicates or displays the IP address of the network device using the LED indicators of its ports (e.g., the LED indicators of ports 1-10) (operation 136). Communication 132 can indicate a physical action taken by user 114 on network device 112, (e.g., user 114 pressing the LED mode button on network device 112). An exemplary sequence is described below in relation to FIGS. 3A-D. After completing the sequence, the network device can detect the end of the sequence (operation 138) and can return to a default LED mode (operation 140). The default LED mode can be set by user 114 or configured on network device 112 as any of the possible LED modes which may be selected or activated. For example, as described below in relation to FIG. 2, one possible LED default mode can be a speed mode, in which an LED mode indicator (264) can indicate that the network device (200) is operating in a high-speed (or other speed-level) mode. Another possible LED mode can be a Power Over Ethernet (POE) mode, in which an LED mode indicator (266) can indicate that the network device (200) is operating in a Power Over Ethernet (POE) mode. Other default LED modes may be possible. The examples of LED modes described herein are provided for illustrative purposes only.

In some aspects, network device 112 can detect the activation of the IP LED mode based on a command received via software running on network device 112. For example, devices 108 and 110 may generate and send, respectively, commands 170 and 174 to activate the IP LED mode on network device 112. While two devices (108 and 110) are illustrated in FIG. 1 as sending commands to activate the IP LED mode on network device 112, more or fewer devices may be included in environment 100. Network device 112 (e.g., software running on network device 112) may receive the command (via, e.g., a communication 156) and can perform the operations as described above in operations 134-140. Communication 156 may be received by network device 112 via one of the ports on network device 112. Network device 112 may send a notification 158 (e.g., via one of the ports on network device 112) to devices 108 and 110 that the sequence has been initiated or has been completed and that network device 112 has returned to a default LED mode. Notification 158 can be received by devices 108 and 110 via, respectively, communications 172 and 176. Devices 108 and 110 may track the receipt of notification 158 (via communications 172 and 176), e.g., by storing in a log information related to sending commands 170/174 and receiving notification 158 via communications 172/176.

In other aspects, user 106 may determine to activate the IP LED mode of network device 112 using device 102, e.g., perform an operation 150 which is received by device 102 via a communication 152 and sent as a command to network device 112 over network 111 (via a communication 154). Similar to communication 132, communication 152 can indicate a physical action taken by user 106 via display 104 (and peripheral input/output devices, not shown associated with device 102), e.g., user 106 selecting a widget or other user interface (UI) element on display 104 which sends the command (154) to activate the IP LED mode on network device 112. Network device 112 (e.g., software running on network device 112) may receive the command (via, e.g., communication 156) and can perform the operations as described above in operations 134-140. Network device 112 may send a notification 158 to device 102 that the sequence has been initiated or has been completed and that network device 112 has returned to a default LED mode. Notification 158 can be received by device 102 via a communication 160. Notification 158 can be a message which when received by device 102 can be displayed on display 104. For example, device 102 can display, on display 104, information pertaining to the notification received via communication 160, e.g.: a notification that the sequence has been initiated; a notification that the sequence has been completed; and a notification that network device 112 has returned to a default LED mode.

Network Device with Multiple Ports and Corresponding LED Indicators

Figure 2:
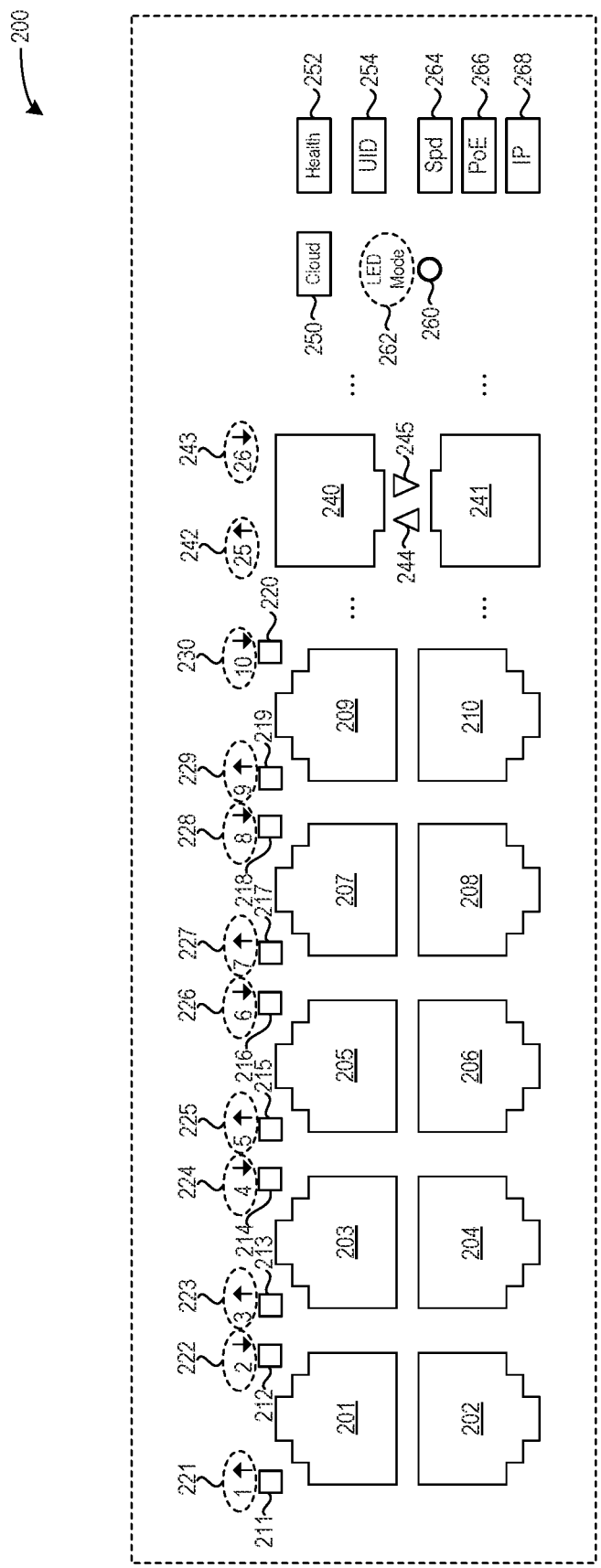
FIG. 2 illustrates an exemplary network device with multiple ports and corresponding LED indicators, in accordance with an aspect of the present application.

FIG. 2 illustrates an exemplary network device 200 with multiple ports and corresponding LED indicators, in accordance with an aspect of the present application. Network device 200 can include ports 201-210, such as RJ45 ports, each with a corresponding LED indicator (respectively, LED indicators 211-220). Each LED indicator can be located near a label on network device 200. The label can denote the port number for the corresponding LED indicator. The label can also include an arrow indicating whether the port is the upper or the lower port of a pair of ports in a vertical position. For example: a label 221 located above LED indicator 211 can denote that port "1" is the upper port 201 of ports 201/202 based on an upward pointing arrow; a label 222 located above LED indicator 212 can denote that port "2" is the lower port 202 of ports 201/202 based on a downward pointing arrow; a label 223 located above LED indicator 213 can denote that port "3" is the upper port 203 of ports 203/204 based on an upward pointing arrow; a label 224 located above LED indicator 214 can denote that port "4" is the lower port 204 of ports 203/204 based on a downward pointing arrow; a label 225 located above LED indicator 215 can denote that port "5" is the upper port 205 of ports 205/206 based on an upward pointing arrow; a label 226 located above LED indicator 216 can denote that port "6" is the lower port 206 of ports 205/206 based on a downward pointing arrow; a label 227 located above LED indicator 217 can denote that port "7" is the upper port 207 of ports 207/208 based on an upward pointing arrow; a label 228 located above LED indicator 218 can denote that port "8" is the lower port 208 of ports 208/209 based on a downward pointing arrow; a label 229 located above LED indicator 219 can denote that port "9" is the upper port 209 of ports 209/210 based on an upward pointing arrow; and a label 230 located above LED indicator 220 can denote that port "10" is the lower port 210 of ports 209/210 based on a downward pointing arrow.

In addition to ports 201-210, network device 200 can include a set of small form-factor pluggable (SFP) ports 240 and 241, each with a corresponding LED indicator (respectively, LED indicators 244 and 245). LED indicators 244 and 245 may be located near SFP ports 240 and 241 (as shown in FIG. 2) or near a label on network device 200 (as shown in relation to labels 221-230 in FIG. 2). The label for the SFP port can denote the port number for the corresponding LED indicator and an arrow indicating whether the port is the upper or the lower port of a pair of ports in a vertical position, and the LED indicator itself can also be shaped in a manner which indicates a direction of upward or downward for the corresponding SFP port. For example: a label 242 can denote that port "25" is the upper port 240 of ports 240/241 based on an upward pointing arrow, while the corresponding LED indicator 244 can also indicate the upward direction and point toward upper port 240; and a label 243 can denote that port "26" is the lower port 241 of ports 240/241 based on a downward pointing arrow, while the corresponding LED indicator 244 can also indicate the downward direction and point toward lower port 241. SFP ports 240 and 241 are provided as an illustrative example only. The LED indicators (244 and 245) for SFP ports 240 and 241 may operate independently of the LED mode currently selected for device 200 or may also be turned off during the steps in which all of the LED indicators may be turned off (as described below in relation to the sequence of FIGS. 3A-D). Furthermore, in some aspects, ports 201-210 may be SFP ports with LED indicators in a similar location as LED indicators 211-220, which are located near to labels 221-230, respectively.

Network device 200 may include at least ports 201-210, i.e., can include more ports than illustrated in FIG. 2. For example, network device 200 may include two rows of 12 ports each or two rows of 24 ports each. Each pair of upper and lower ports may be grouped together into sets of six. For example, 24 ports may be configured (i.e., the 24 ports may be located on the network device in a particular configuration) as two groups of 12 ports, where each of the two groups can include six "upper/lower" pairs of ports. As another example, 48 ports may be configured (i.e., the 48 ports may be located on the network device in a particular configuration) as four groups of 12 ports, where each of the four groups can include six "upper/lower" pairs of ports. Other configurations of the at least ten ports are possible. The provided examples are not intended to be either exhaustive or limiting. In addition, network device 200 with ports 201-210 (i.e., ports 1-10 or the first ten ports) is provided for illustrative purposes only, i.e., ports 1-9 can indicate digits 1-9 and port 10 can indicate digit 0, however other groups of numbered ports (such as ports 21-30 in a switch configured with 48 ports) may also be used to indicate digits 1-9 (e.g., the LED indicators of ports 21-29) and digit 0 (e.g., the LED indicator of port 30). Thus, the aspects which describe "at least the first ten ports" are not limited to only ports 1-10. Network device 200 may also include more or fewer SFP ports than as illustrated in FIG. 2.

Network device 200 can also include mode indicators 250, 252, and 254 as well as LED mode indicators 264, 266, and 268. For example, mode indicators 250, 252, and 254 can include a block of text or graphic element and a corresponding LED indicator which lights up the block of text or graphic element. Mode indicator 250 can indicate that network device 200 is a cloud node, mode indicator 252 can indicate a health of network device 200, and mode indicator 254 can indicate a "Universal Identifier" mode which is a mode that may only be enabled by software. Mode indicators 250-254 are depicted for illustrative purposes only and to denote that network device 200 may include LED or displayed indicators which are located close to an LED mode button 260 (and LED mode indicators 264-268, as described below) but do not indicate an LED mode.

Network device 200 can also include LED mode button 260 (indicated by a label 262 denoting "LED Mode"). LED mode button 260 can be a button which toggles or cycles through the LED modes represented by LED mode indicators 264, 266, and 268. Similar to mode indicators 250-254, LED mode indicators 264-268 can include a block of text or graphic element and a corresponding LED indicator which lights up the block of text or graphic element. LED mode indicator 264 can indicate that network device 200 is operating in a high-speed (or other speed-level) mode. LED mode indicator 266 can indicate that network device 200 is operating in a Power Over Ethernet (POE) mode. LED mode indicator 268 can indicate that network device 200 is operating in an IP LED mode. In the IP LED mode, the corresponding LED indicator for ports numbered 1-9 can respectively indicate digits "1-9," while the corresponding LED indicator for the port numbered 10 can indicate the digit "0."

Network device 200 can further include a pinhole hard reset button with a label which denotes "Reset" (not shown).

In one aspect, during operation, a user can press LED mode button 260 to select the IP LED mode by toggling until IP LED mode indicator 268 is turned on. Selecting the IP LED mode can activate the IP LED mode on network device 200, which can initiate the sequence indicating the IP address of the network device, as described below in relation to FIGS. 3A-D.

Display Sequence for IP Address Using Port LED Indicators

Figure 3A:
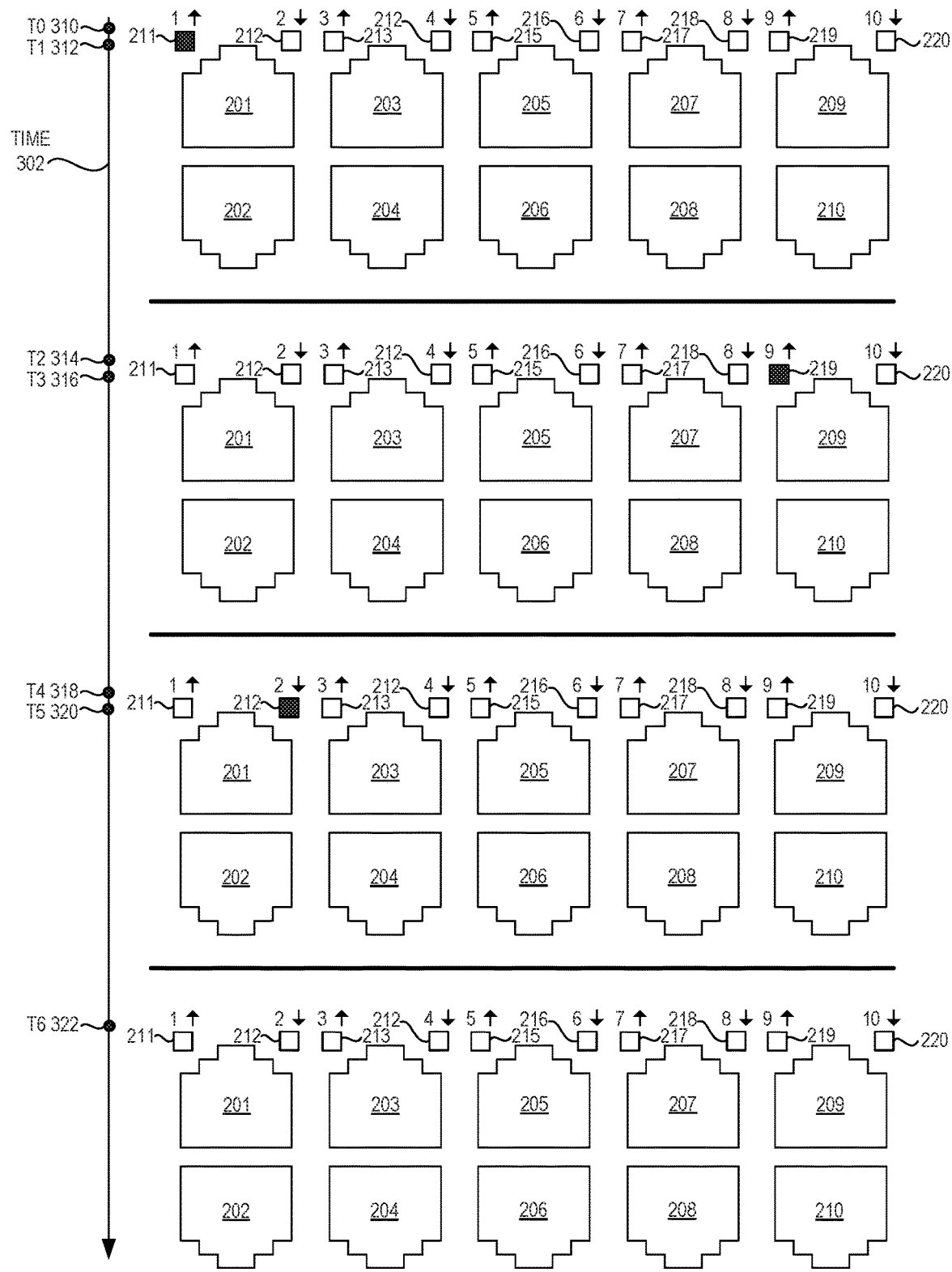
FIGS. 3A, 3B, 3C, and 3D illustrate an exemplary display sequence for facilitating displaying the IP address of a network device using the port LED indicators, in accordance with an aspect of the present application.

FIGS. 3A, 3B, 3C, and 3D illustrate an exemplary display sequence for facilitating displaying the IP address of a network device using the port LED indicators, in accordance with an aspect of the present application. The display sequence illustrated in FIGS. 3A-D can include a progression of a time 302. The IP address of the network device of FIGS. 3A-D can be, e.g., 192.168.0.1. FIG. 3A indicates a sequence 300 for displaying "192" and "dot" of the IP address. In FIG. 3A, the network device can detect an activation of the IP LED mode and initiate the sequence to indicate the IP address of the network device. The network device can detect the activation based on a user pressing the LED mode button on the network device. For example, the user can press the LED mode button one or more times to select the IP LED mode. The user can also hold the LED mode button for at least a predetermined amount of time (such as three seconds) or press the LED mode button in a pattern comprising one or more holds at one or more predetermined time intervals or based on one or more time thresholds (such as two quick presses followed by a longer hold of a specific duration or greater than a specific time threshold).

At a time T0 310, the network device can turn off (not shown) at least the first ten LED indicators 211-220 corresponding to ports 1-10. At a time T1 312, network device can turn on LED indicator 211 corresponding to port 1 (201), as illustrated by the filled-in element 211. LED indicator 211 may remain on for a first predetermined period of time, e.g., 1 second, which can indicate the digit "1." At a time T2 314, the network device can turn off LED indicator 211 and wait a shortened amount of time (e.g., 0.25 seconds) which is shorter than the first predetermined period of time. The shortened amount of time can be a third predetermined period of time. Thus, subsequent to turning off the corresponding LED indicator for the numbered port of a digit (e.g., at time T2 314) and prior to turning on the corresponding LED indicator for the numbered port of a subsequent digit in a same group of numbers of the IP address (e.g., at time T3 316), the network device can keep at least the first ten LED indicators off for the shortened amount of time.

At a time T3 316, network device can turn on LED indicator 219 corresponding to port 9 (209) for the first predetermined period of time, as illustrated by the filled-in element 219, which can indicate the digit "9." At a time T4 318, the network device can turn off LED indicator 219 for the shortened amount of time. At a time T5 320, network device can turn on LED indicator 212 corresponding to port 2 (202) for the first predetermined period of time, as illustrated by the filled-in element 212, which can indicate the digit "2." At a time T6 322, the network device can turn off at least the first ten LED indicators for a second predetermined period of time, e.g., 2 seconds, which can indicate the dot between the separate portions of the IP address.

Figure 3B:
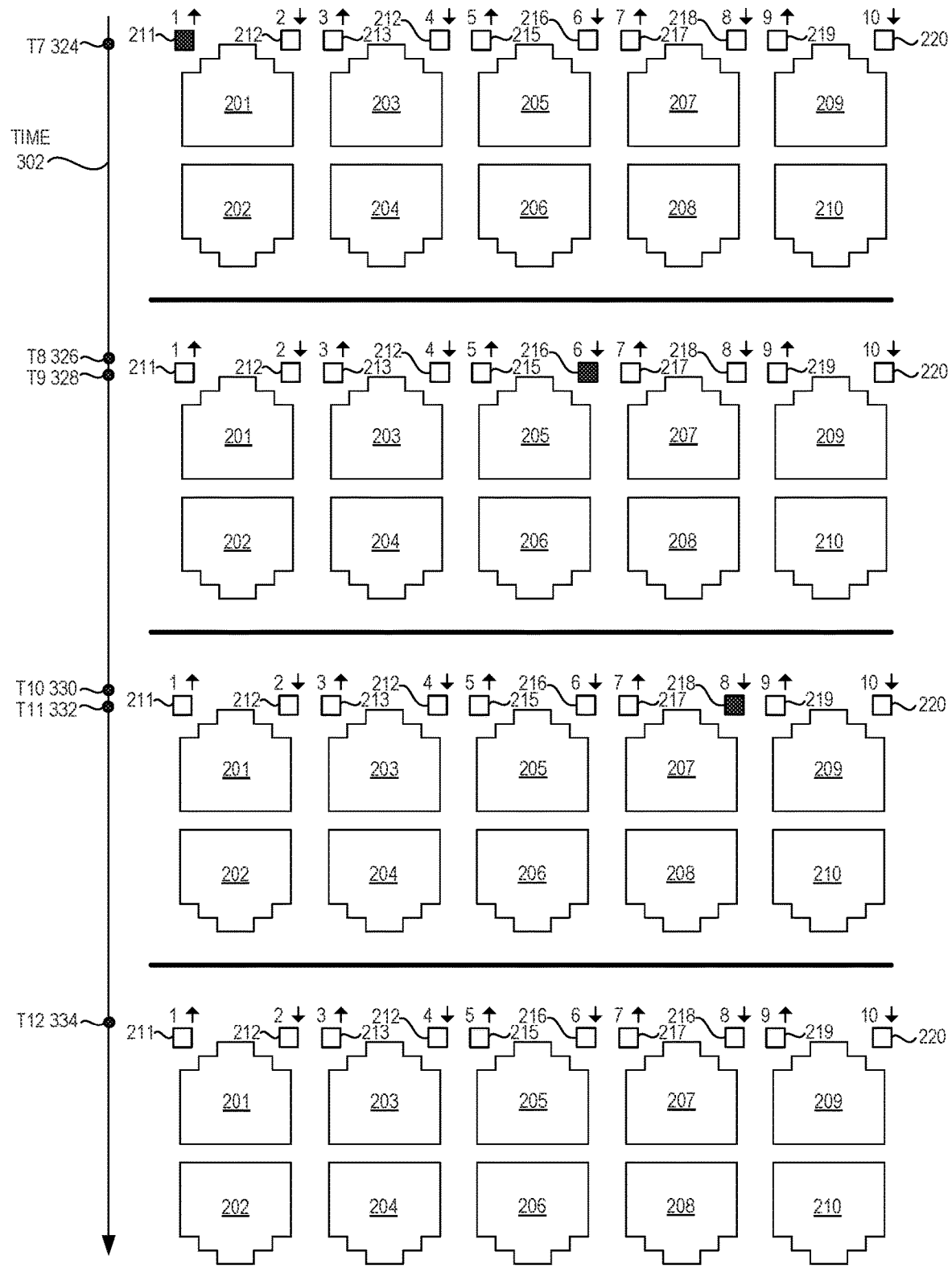

FIG. 3B indicates a sequence 320 for displaying "168" and "dot" of the IP address. In FIG. 3B, at a time T7 324, network device can turn on LED indicator 211 corresponding to port 1 (201), as illustrated by the filled-in element 211. LED indicator 211 may remain on for the first predetermined period of time, which can indicate the digit "1." At a time T8 326, the network device can turn off LED indicator 211 and wait the shortened amount of time. At a time T9 328, network device can turn on LED indicator 216 corresponding to port 6 (206) for the first predetermined period of time, as illustrated by the filled-in element 216, which can indicate the digit "6." At a time T10 330, the network device can turn off LED indicator 216 for the shortened amount of time. At a time T11 332, network device can turn on LED indicator 218 corresponding to port 8 (208) for the first predetermined period of time, as illustrated by the filled-in element 218, which can indicate the digit "8." At a time T12 334, the network device can turn off at least the first ten LED indicators for the second predetermined period of time, which can indicate the dot between the separate portions of the IP address.

Figure 3C:
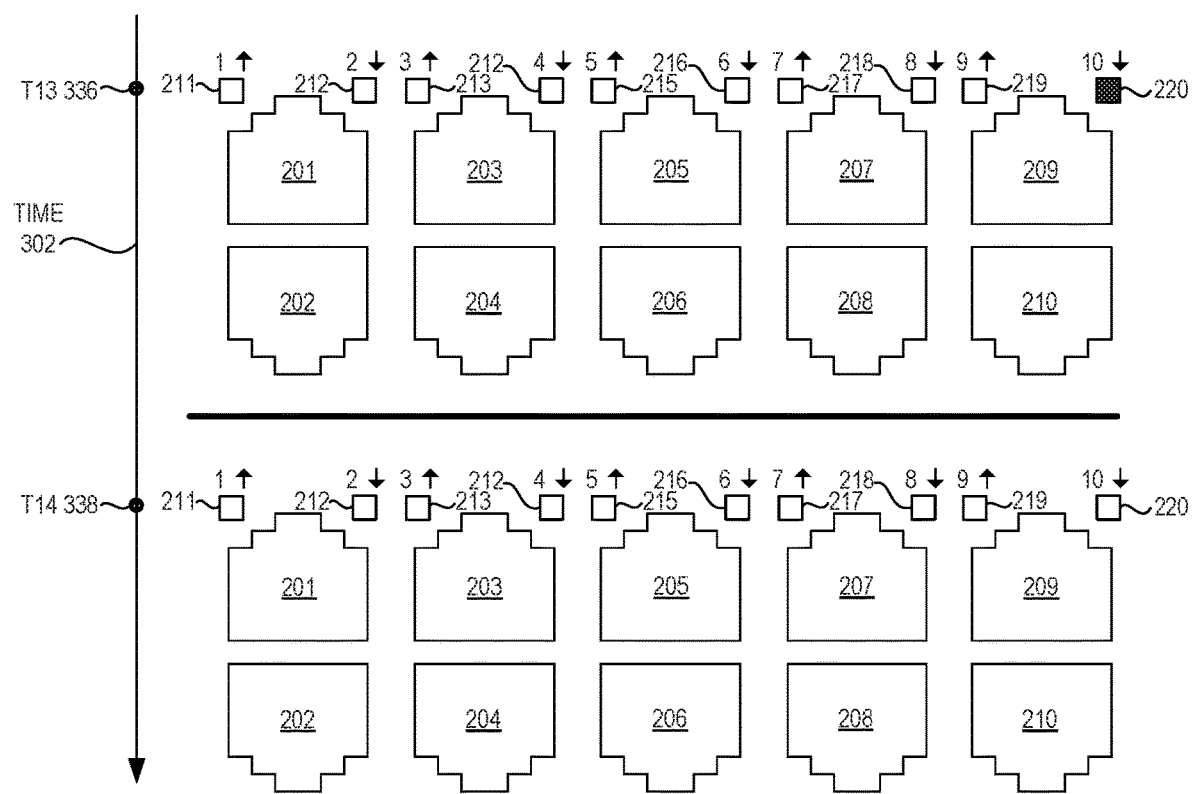

FIG. 3C indicates a sequence 340 for displaying "0" and "dot" of the IP address. In FIG. 3C, at a time T13 336, the network device can turn on LED indicator 220 corresponding to port 10 (210), as illustrated by the filled-in element 220. LED indicator 211 may remain on for the first predetermined period of time, which can indicate the digit "0." At a time T14 338, the network device can turn off at least the first ten LED indicators for the second predetermined period of time, which can indicate the dot between the separate portions of the IP address.

Figure 3D:
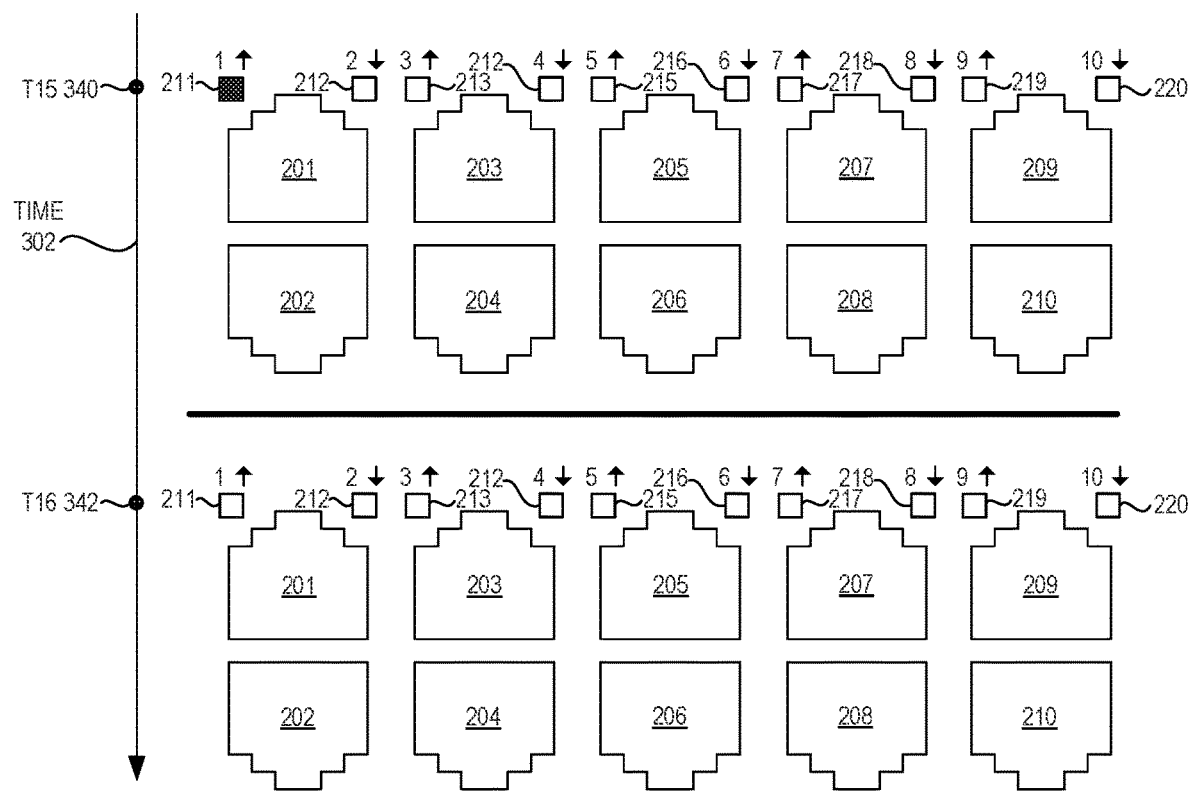

FIG. 3D indicates a sequence 360 for displaying "1" and a completion of the IP address. In FIG. 3C, at a time T15 340, the network device can turn on LED indicator 211 corresponding to port 1 (201), as illustrated by the filled-in element 211. LED indicator 211 may remain on for the first predetermined period of time, which can indicate the digit "1." At a time T16 342, the network device can turn off at least the first ten LED indicators, e.g., for at least the second predetermined period of time, which can indicate end of the IP address.

In some aspects, the network device may return to a default LED mode after indicating the sequence in the manner described above in FIGS. 3A-D. In some aspects, the network device may be operating in a default LED mode or a user-selected LED mode prior to the sequence initiating. As described above in relation to operation 140 of FIG. 1, the default LED mode can be set by a user or configured on the network device as any of the possible LED modes which may be selected or activated, e.g., one possible LED default mode can be a speed mode (as shown by LED mode indicator 264 in FIG. 2); and another possible LED mode can be a POE mode (as shown by LED mode indicator 266 in FIG. 2). Other default or user-selected LED modes may be possible. The examples of LED modes described herein are provided for illustrative purposes only.

In other aspects, the network device may initiate the sequence for indicating the IP address again (i.e., returning to the operations starting at time T1) and continue cycling through the sequence a preset number of times before returning to the default mode. The preset number can be configured by the user, the system, or software running on the network device. An example of the preset number can be 2 or 5.

In other aspects, the network device may continue cycling through the sequence until detecting that the LED mode has been manually changed, e.g., the user presses the LED mode button and returns the LED mode to a different or a default mode.

In FIGS. 3A-D, turning on and off the LED indicator for the numbered port may include displaying a pattern of on/off flashes or more than a single color or pattern, instead of turning the LED indicator on for a single predetermined period of time (e.g., the first predetermined period of time). For example, turning on the LED indicator can be based on: displaying one or more colors for one or more predetermined time intervals; or displaying one or more patterns for one or more predetermined time intervals. Furthermore, prior to initiating the sequence and while indicating the dot between the separate portions of the IP address, the network device can turn off all the LED indicators corresponding to all the ports (i.e., not just the first ten LED indicators corresponding to the first ten ports).

Displaying IP Address Using Port LED Indicators

Figure 4:
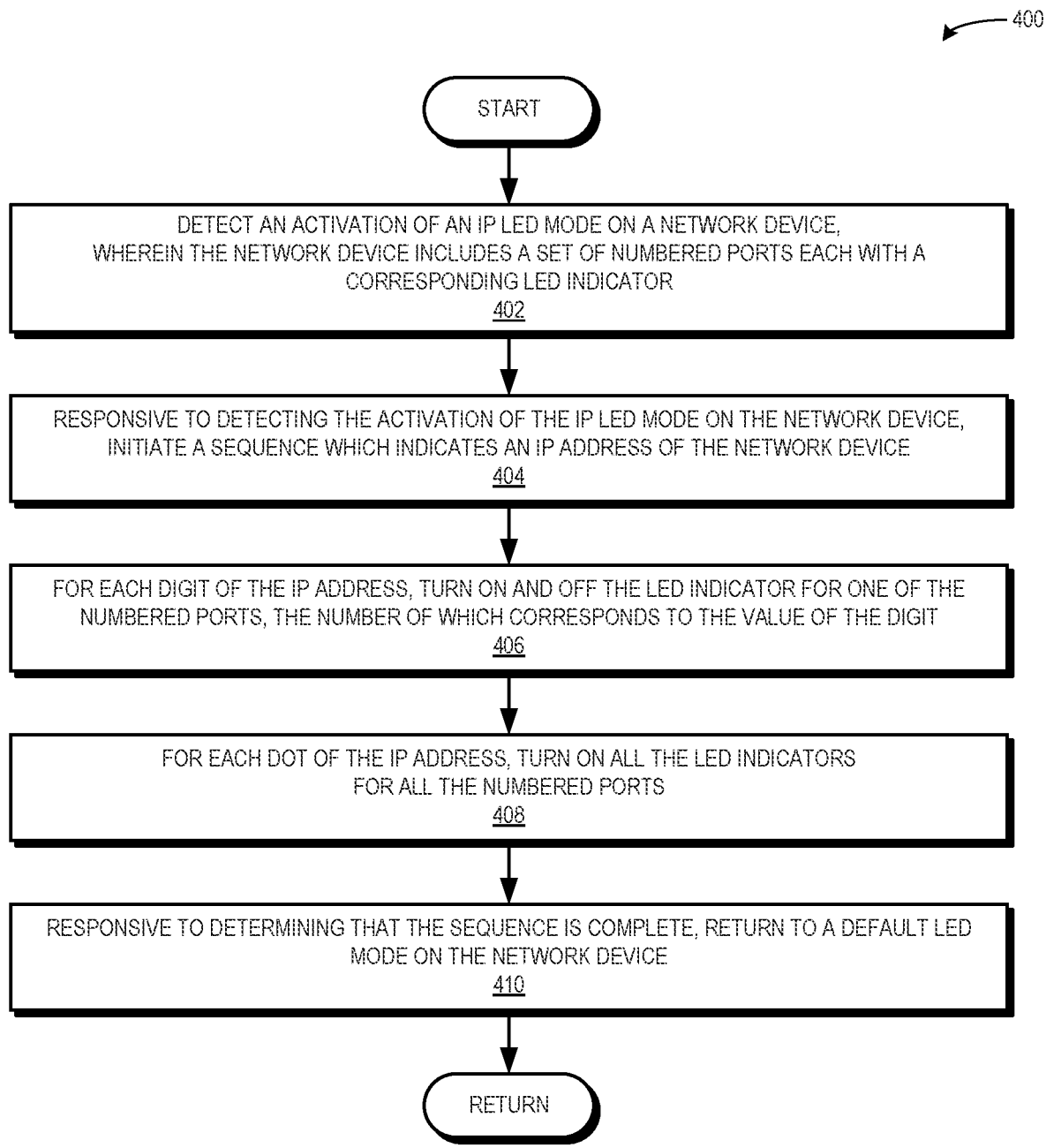
FIG. 4 presents a flowchart illustrating a method for facilitating displaying the IP address of a network address using the port LED indicators, in accordance with an aspect of the present application.

FIG. 4 presents a flowchart 400 illustrating a method for facilitating displaying the IP address of a network address using the port LED indicators, in accordance with an aspect of the present application. During operation, the system (i.e., a network device such as a switch) detects an activation of an IP light-emitting diode (LED) mode on the network device, wherein the network device includes a set of numbered ports each with a corresponding LED indicator (operation 402). The network device can detect the activation based on a user pressing an LED mode button, as described above in relation to operation 130 in FIG. 1 and LED mode button 260 of FIG. 2. The network device can also detect the activation based on a command received via software running on the network device, as described above in relation to commands 154, 170, and 174 of FIG. 1.

Responsive to detecting the activation, the network device initiates a sequence which indicates an IP address of the network device (operation 404), by performing operations 406 and 408. That is, for each digit of the IP address, the network device turns on and off the LED indicator for one of the numbered ports, the number of which corresponds to the value of the digit (operation 406) and for each dot of the IP address, the network device turns off all the LED indicators (operation 408). The network device can turn on the LED indicators for the numbered ports (to indicate a digit) for a first predetermined period of time and can further turn off all the (or at least the first ten) LED indicators (to indicate a dot) for a second predetermined period of time. In addition, the network device can wait a shortened amount of time (e.g., shorter than the first predetermined amount of time) when turning off the LED indicator for a digit.

Responsive to determining that the sequence is complete, the network device returns to a default LED mode on the network device (operation 410). The network device may return to the default LED mode after indicating the sequence in the manner described above in FIGS. 3A-D. Alternatively, the network device may initiate the sequence for indicating the IP address again (i.e., returning to the operations starting at time T1 of FIG. 3A) and continue cycling through the sequence for a preset number of times before returning to the default mode. The preset number can be configured by the user, the system, or software running on the network device. The network device may also determine that the sequence is complete based on detecting a manual change of the LED mode. That is, the network device can continue cycling through the sequence until detecting that the LED mode has been manually changed, e.g., the user presses the LED mode button and returns the LED mode to a different or a default mode.

Computer System and Computer-Readable Medium

Figure 5:
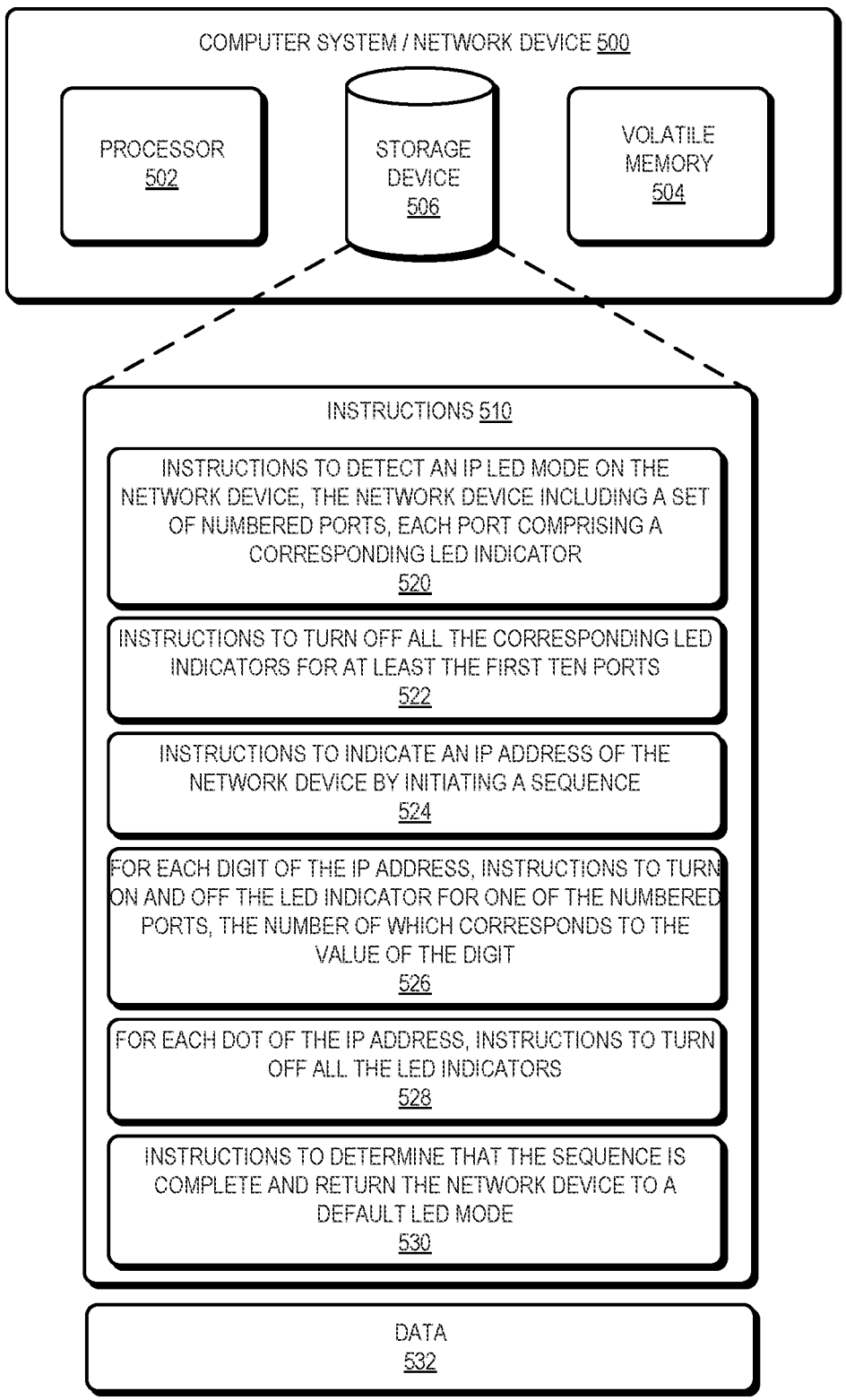
FIG. 5 illustrates a computer system for facilitating displaying the IP address of a network address using the port LED indicators, in accordance with an aspect of the present application.

FIG. 5 illustrates a computer system 500 for facilitating displaying the IP address of a network address using the port LED indicators, in accordance with an aspect of the present application. Computer system 500 may be a network device. Computer system 500 includes a processor 502, a memory 504, and a storage device 506. Memory 504 can include a volatile memory (e.g., random access memory (RAM)) that serves as a managed memory and can be used to store one or more memory pools. In some aspects, computer system 500 can be coupled to peripheral I/O user devices (e.g., a display device, a keyboard, and a pointing device) (not shown). Storage device 506 includes non-transitory computer-readable storage medium and stores instructions 510 and data 532. Computer system 500 may include fewer or more entities or instructions than those shown in FIG. 5. Computer system/network device 500 can include at least ten numbered ports (not shown), as described above in relation to network device 112 of FIG. 1 and network device 200 of FIG. 2.

Instructions 510 can include instructions 520-530, which when executed by computer system 500, can cause computer system 500 to perform methods and/or processes described in this disclosure. Specifically, instructions 510 can include instructions 520 to detect an activation of an IP LED mode on the network device, the network device including a set of numbered ports, each port comprising a corresponding LED indicator. Instructions 510 can include instructions 522 to, responsive to detecting the activation, turn off the corresponding LED indicators for at least the first ten numbered ports.

Instructions 510 can further include instructions 524 to indicate an IP address of the network device by initiating a sequence. Instructions 510 can include instructions 526, for each digit of the IP address, to turn on and off the LED indicator for one of the numbered ports, the number of which corresponds to the value of the digit. Instructions 510 can include instructions 528, for each dot of the IP address, to turn off all the LED indicators. Instructions 510 can include instructions 530 to determine that the sequence is complete and return the network device to a default mode. Instructions 520-530 can additionally include operations as described above in relation to FIGS. 1, 3A-D, and 4.

Data 532 can include any data that is required as input or that is generated as output by the methods, operations, communications, and/or processes described in this disclosure. Specifically, data 532 can store at least: a command; an indicator of an IP LED mode; a sequence for displaying a series of numbers, e.g., an IP address with groups or portions of numbers separated by a dot; an indicator of a default LED mode; a first predetermined period of time; a second predetermined period of time; a shortened amount of time; a preset number; and a predetermined time interval.

Figure 6:
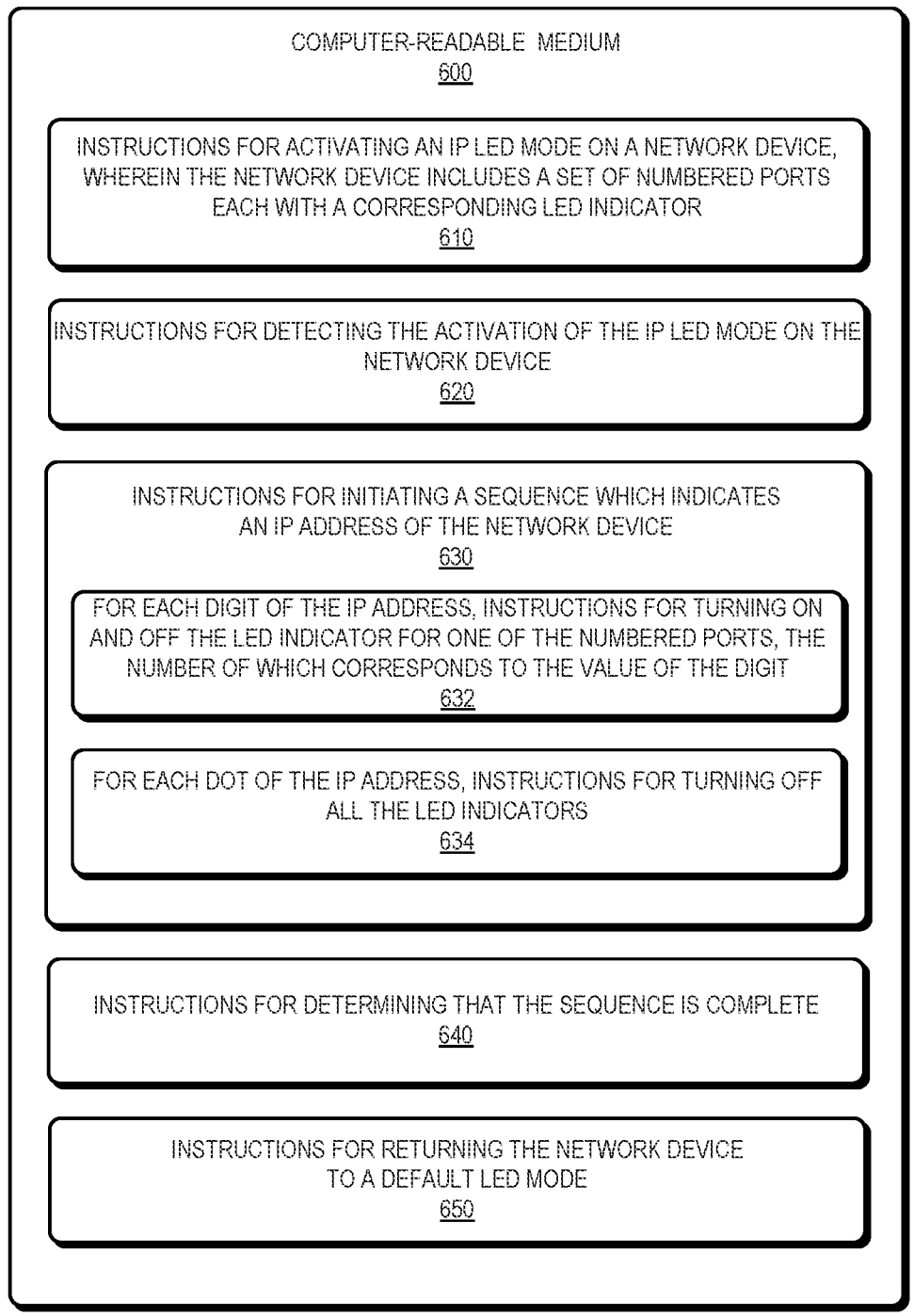
FIG. 6 illustrates a non-transitory computer-readable medium for facilitating displaying the IP address of a network address using the port LED indicators, in accordance with an aspect of the present application.

FIG. 6 illustrates a non-transitory computer-readable medium 600 for facilitating displaying the IP address of a network address using the port LED indicators, in accordance with an aspect of the present application. Computer-readable medium 600 can be a non-transitory computer-readable storage medium storing instructions that when executed by a computer cause the computer to perform a method. Computer-readable medium 600 can store instructions 610 for activating an IP LED mode on a network device, wherein the network device includes a set of numbered ports each with a corresponding LED indicator. Computer-readable medium 600 can store instructions 620 for detecting the activation of the IP LED mode on the network device. Computer-readable medium 600 can store instructions 630 for initiating a sequence which indicates an IP address of the network device. Instructions 630 can include: instructions 632, in each digit of the IP address, for turning on and off the LED indicator for one of the numbered ports, the number of which corresponds to the value of the digit; and instructions 634, in each dot of the IP address, for turning off all the LED indicators. Computer-readable medium 600 can store instructions 640 for determining that the sequence is complete. Computer-readable medium 600 can store instructions 650 for returning the network device to a default LED mode.

Computer-readable medium 600 may include more instructions than those shown in FIG. 6. For example, computer-readable medium 600 can also store instructions for executing the operations described above based on, e.g.: the first predetermined amount of time; the second predetermined amount of time; the shortened period of time; and the preset number, as described above in relation to the communications depicted in FIG. 1 and the sequence displayed in FIGS. 3A-D. Device 600 can also store instructions for executing the operations described above based on instructions 510 of computer system 500 in FIG. 5.

Various Aspects

In general, the disclosed aspects provide a method, computer system, and non-transitory computer-readable storage medium for facilitating displaying an IP address of a network device. During operation, the system detects an activation of an IP light-emitting diode (LED) mode on the network device, wherein the network device includes a set of numbered ports each with a corresponding LED indicator. Responsive to detecting the activation, the system initiates a sequence which indicates an IP address of the network device by: for each digit of the IP address, turning on and off the LED indicator for one of the numbered ports, the number of which corresponds to the value of the digit; and for each dot of the IP address, turning off all the LED indicators. Responsive to determining that the sequence is complete, the system returns to a default LED mode on the network device.

In a variation on this aspect, detecting the activation is based on a user pressing an LED mode button on the network device.

In a further variation on this aspect, the user pressing the LED mode button on the network device turns on an LED indicator on the network device corresponding to the IP LED mode.

In a further variation on this aspect, the user pressing the LED mode button on the network device comprises at least one of: the user holding the LED mode button for at least a predetermined amount of time; or the user pressing the LED mode button in a pattern comprising one or more holds at one or more predetermined time intervals or based on one or more time thresholds.

In a further variation, detecting the activation comprises receiving, based on software installed on the network device, a command to activate the LED mode on the network device.

In a further variation, responsive to detecting the activation and prior to initiating the sequence, the system turns off the corresponding LED indicators for all the numbered ports.

In a further variation, the corresponding LED indicators for ports numbered one through nine respectively indicate digits one through nine, and the corresponding LED indicator for a port numbered ten indicates a digit zero.

In a further variation, initiating the sequence further comprises: for each digit of the IP address, turning on and off the corresponding LED indicator for the numbered port for a first predetermined period of time; and for each dot of the IP address, turning off all the LED indicators for a second predetermined period of time.

In a further variation, initiating the sequence further comprises, subsequent to turning off the corresponding LED indicator for the numbered port of a digit and prior to turning on the corresponding LED indicator for the numbered port of a subsequent digit in a same group of numbers of the IP address, keeping all the LED indicators off for a shortened amount of time which is less than the first predetermined period of time.

In a further variation, the second predetermined period of time is different from the first predetermined period of time.

In a further variation, turning on and off the LED indicator for the numbered port comprises at least one of: displaying one or more colors for one or more predetermined time intervals; or displaying one or more patterns for one or more predetermined time intervals.

In a further variation, the network device does not include a serial interface.

In a further variation, determining that the sequence is complete is based on at least one of: a user pressing an LED mode button on the network device one or more times until a different or a default LED mode is activated; or the sequence cycling through a preset number of times.

In another aspect, a network device comprises: a processor; a set of at least ten numbered ports, each port comprising a corresponding LED indicator; and a storage device storing instructions that when executed by the processor cause the processor to perform a method. The method can include detecting an activation of an IP light-emitting diode (LED) mode on the network device. The method can also include, responsive to detecting the activation, turning off the corresponding LED indicators for at least the first ten numbered ports. The method can further include indicating an IP address of the network device by initiating a sequence, wherein initiating the sequence comprises: for each digit of the IP address, turning on and off the LED indicator for one of the numbered ports, the number of which corresponds to the value of the digit; and for each dot of the IP address, turning off all the LED indicators. The method can also include returning the network device to a default LED mode in response to determining that the sequence is complete. The method can also include the operations described herein, including in relation to: the communications depicted in FIG. 1; the sequence displayed in FIGS. 3A-D; the operations of flowchart 400 in FIG. 4; the instructions of computer system 500 in FIG. 5; and the instructions of computer-readable medium 600 in FIG. 6.

In yet another aspect, a non-transitory computer-readable storage medium stores instructions that when executed by a computer cause the computer to perform a method. The method can include activating an IP-light-emitting diode (LED) mode on a network device, wherein the network device includes a set of numbered ports each with a corresponding LED indicator and detecting the activation of the IP LED mode on the network device. The method can also include initiating a sequence which indicates an IP address of the network device by: for each digit of the IP address, turning on and off the LED indicator for one of the numbered ports, the number of which corresponds to the value of the digit; and for each dot of the IP address, turning off all the LED indicators. The method can also include determining that the sequence is complete and returning the network device to a default LED mode. The method performed based on the instructions stored in the computer-readable storage medium can also include the operations described herein, including in relation to: the communications depicted in FIG. 1; the sequence displayed in FIGS. 3A-D; the operations of flowchart 400 in FIG. 4; the instructions of computer system 500 in FIG. 5; and the instructions of computer-readable medium 600 in FIG. 6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method for displaying an Internet Protocol (IP) address of a network device, the method comprising:
    detecting an activation of an IP light-emitting diode (LED) mode on the network device, wherein the network device includes a set of numbered ports each with a corresponding LED indicator;
    responsive to detecting the activation, initiating a sequence which indicates an IP address of the network device by:
        for each digit of the IP address, turning on and off the LED indicator for one of the numbered ports, the number of which corresponds to the value of the digit; and
        for each dot of the IP address, turning off all the LED indicators; and
    responsive to determining that the sequence is complete, returning to a default LED mode on the network device.

2. The method of claim 1,
    wherein detecting the activation is based on a user pressing an LED mode button on the network device.

3. The method of claim 2,
    wherein the user pressing the LED mode button on the network device turns on an LED indicator on the network device corresponding to the IP LED mode.

4. The method of claim 2,
    wherein the user pressing the LED mode button on the network device comprises at least one of:
    the user holding the LED mode button for at least a predetermined amount of time; or
    the user pressing the LED mode button in a pattern comprising one or more holds at one or more predetermined time intervals or based on one or more time thresholds.

5. The method of claim 1, wherein detecting the activation comprises:
receiving, based on software installed on the network device, a command to activate the LED mode on the network device.

6. The method of claim 1, wherein responsive to detecting the activation and prior to initiating the sequence, the method further comprises:
turning off the corresponding LED indicators for all the numbered ports.

7. The method of claim 1,
wherein the corresponding LED indicators for ports numbered one through nine respectively indicate digits one through nine, and
wherein the corresponding LED indicator for a port numbered ten indicates a digit zero.

8. The method of claim 1, wherein initiating the sequence further comprises:
for each digit of the IP address, turning on and off the corresponding LED indicator for the numbered port for a first predetermined period of time; and
for each dot of the IP address, turning off all the LED indicators for a second predetermined period of time.

9. The method of claim 8, wherein initiating the sequence further comprises:
subsequent to turning off the corresponding LED indicator for the numbered port of a digit and prior to turning on the corresponding LED indicator for the numbered port of a subsequent digit in a same group of numbers of the IP address, keeping all the LED indicators off for a shortened amount of time which is less than the first predetermined period of time.

10. The method of claim 8,
wherein the second predetermined period of time is different from the first predetermined period of time.

11. The method of claim 1, wherein turning on and off the LED indicator for the numbered port comprises at least one of:
displaying one or more colors for one or more predetermined time intervals; or
displaying one or more patterns for one or more predetermined time intervals.

12. The method of claim 1,
wherein the network device does not include a serial interface.

13. The method of claim 1, wherein determining that the sequence is complete is based on at least one of:
a user pressing an LED mode button on the network device one or more times until a different or a default LED mode is activated; or
the sequence cycling through a preset number of times.

14. A network device, comprising:
a processor;
a set of at least ten numbered ports, each port comprising a corresponding LED indicator; and
a storage device storing instructions that when executed by the processor cause the processor to perform a method, the method comprising:
detecting an activation of an IP light-emitting diode (LED) mode on the network device;
responsive to detecting the activation, turning off the corresponding LED indicators for at least the first ten numbered ports;
indicating an IP address of the network device by initiating a sequence, wherein initiating the sequence comprises:
for each digit of the IP address, turning on and off the LED indicator for one of the numbered ports, the number of which corresponds to the value of the digit; and
for each dot of the IP address, turning off all the LED indicators; and
returning the network device to a default LED mode in response to determining that the sequence is complete.

15. The network device of claim 14,
wherein detecting the activation is based on a user pressing an LED mode button on the network device.

16. The network device of claim 15, wherein the user pressing the LED mode button on the network device is based on at least one of:
the user pressing the LED mode button on the network device one or more times and turning on an LED indicator on the network device corresponding to the IP LED mode;
the user holding the LED mode button for at least a predetermined amount of time; or
the user pressing the LED mode button in a pattern comprising one or more holds at one or more predetermined time intervals or based on one or more time thresholds.

17. The network device of claim 14,
wherein the method further comprises installing software on the network device, the software comprising instructions to activate the LED mode on the network device; and
and wherein detecting the activation of the IP LED mode comprises receiving, based on the installed software, a command to activate the LED mode on the network device.

18. The network device of claim 14,
wherein the corresponding LED indicators for ports numbered one through nine respectively indicate digits one through nine, and
wherein the corresponding LED indicator for a port numbered ten indicates a digit zero.

19. The network device of claim 14, wherein determining that the sequence is complete is based on at least one of:
a user pressing an LED mode button on the network device one or more times until a different or default LED mode is activated; or
the sequence is cycled through a preset number of times.

20. A non-transitory computer-readable storage medium storing instructions that when executed by a computer cause the computer to perform a method, the method comprising:
activating an IP-light-emitting diode (LED) mode on a network device, wherein the network device includes a set of numbered ports each with a corresponding LED indicator;
detecting the activation of the IP LED mode on the network device;
initiating a sequence which indicates an IP address of the network device by:
for each digit of the IP address, turning on and off the LED indicator for one of the numbered ports, the number of which corresponds to the value of the digit; and
for each dot of the IP address, turning off all the LED indicators;
determining that the sequence is complete; and
returning the network device to a default LED mode.

* * * * *